United States Patent
Suzuki et al.

[11] Patent Number: 5,439,854
[45] Date of Patent: Aug. 8, 1995

[54] TIC-BASE/SIC WHISKER COMPOSITE CERAMIC CUTTING TOOLS

[75] Inventors: Junichiro Suzuki; Shoji Sakakibara; Akiyasu Okuno; Masakazu Watanabe, all of Nagoya, Japan

[73] Assignee: NGK Spark Plug Co., Ltd., Nagoya, Japan

[21] Appl. No.: 131,571

[22] Filed: Oct. 4, 1993

Related U.S. Application Data

[63] Continuation of Ser. No. 78,496, Jul. 28, 1987, abandoned.

[30] Foreign Application Priority Data

| Jul. 31, 1986 | [JP] | Japan | 61-178834 |
| Aug. 15, 1986 | [JP] | Japan | 61-190483 |
| Oct. 6, 1986 | [JP] | Japan | 61-236077 |
| Oct. 6, 1986 | [JP] | Japan | 61-237593 |

[51] Int. Cl.$^6$ .............................................. C04B 35/56
[52] U.S. Cl. ........................................ 501/91; 501/95
[58] Field of Search ............. 501/87, 88, 89, 91, 501/93, 95; 75/232–237, 244

[56] References Cited

U.S. PATENT DOCUMENTS

| 2,356,009 | 8/1944 | Schwarzkopf | 501/87 |
| 2,507,218 | 5/1950 | Oswald | 501/87 |
| 2,849,305 | 8/1958 | Frost | 501/87 |
| 3,679,442 | 7/1972 | Bergna | 501/87 |
| 3,886,254 | 5/1975 | Tanaka et al. | 501/87 |
| 4,063,908 | 12/1977 | Ogawa et al. | 501/87 |
| 4,132,534 | 1/1979 | Valdsaar | 501/87 |
| 4,490,319 | 12/1984 | Lee et al. | 501/87 |
| 4,507,224 | 3/1985 | Toibana et al. | 501/88 |
| 4,543,345 | 9/1985 | Wei | 501/95 |

FOREIGN PATENT DOCUMENTS

| 05480 | 9/1986 | WIPO | C04B 35/56 |

OTHER PUBLICATIONS

Richarson, *Modern Ceramic Eng.*, Marcel Dekker, Inc., New York, 1984, p. 263.

*Primary Examiner*—David Brunsman
*Attorney, Agent, or Firm*—Fish & Richardson

[57] ABSTRACT

A ceramic cutting tool formed of a TiC-based sintered body contains 40 wt % or more of TiC, and 5 to 40 wt % of SiC whisker uniformly dispersed in the sintered body. The SiC whisker has a diameter of 0.2–1.5 μm and a length of 1–20 μm. The sintered body may contain up to 40 wt % of $Al_2O_3$, and further sintering aids. Up to 40% by weight of the TiC may be substituted with at least one of Ti, nitrides, oxides and borides of Ti, and solid-solutions of these nitrides, oxides and borides of Ti to form a TiC-base composition. The TiC base composition may be represented by the formula $(Ti_aM_b)(C_cN_dO_eB_f)_g$, in which M denotes at least one transition metal element of Groups IVa, Va and VIa according to the International Periodic Table, except Ti; and $a+b=1$, $0<b\leq0.5$, $c+d+e+f=1$; $0.5 \leq c \leq 1.0$; $0\leq d\leq 0.5$; $0\leq e\leq 0.3$; $0\leq f\leq 0.5$; and $0.6\leq g\leq 1.1$.

24 Claims, 1 Drawing Sheet

TIC-BASE/SIC WHISKER COMPOSITE CERAMIC CUTTING TOOLS

This is a continuation of Ser. No. 07/078,496, filed 28 Jul. 1987, now abandoned.

FIELD OF THE INVENTION

This invention relates to TiC-base/SiC whisker composite ceramic cutting tools having high toughness, and a method for producing the same. More particularly, it is concerned with a TiC base/SiC whisker composite sintered body best suited for cutting tools, inter alia, cutting tools for high speed cutting of difficult-to-cut materials such as ductile cast iron.

BACKGROUND

Heretofore, TiC has been known to be a high temperature material having an excellent anti-spalling property, because of its high melting point and high hardness, its low thermal expansion, and its sustained heat-conductivity even at high temperatures. In view, however, of the fact that TiC is a material which is difficult to sinter, it has been a general practice to use the material in the form of a cermet which is obtained by adding to TiC various metals such as Co, Ni and so forth, so as to be sintered to a high density, although the addition of such metals has the disadvantage of causing deterioration of heat-resistance of the material.

For example, in the cutting of ductile cast iron, a cermet tip (or insert) utilizing the abovementioned cermet is employed for the finishing cut. Even such a finishing cut, however, will result in rapid wear at a high cutting speed that exceeds 300 m/min., cause cratered wear, and further tend to readily form chipping. At cutting speeds ranging from 150 to 200 m/min., or slower than that, fusion-adhesion takes place, if not to the degree as for tips of super-hard (cemented) materials, to unavoidably roughen the finished surface of the work as cut.

The present inventors have previously proposed a TiC-based ceramic material which, by causing a metal to assume a state of solid-solution in TiC, is excellent in heat-resistance and prevents the detrimental effect caused by the metal component at high temperature (See: Japanese Patent Kokai Publication No. 61-26564 and Japanese Patent Application No. 60-173519, now JP-Patent-Kokai Publication No. 62-36065).

However, the abovementioned TiC-based ceramic material is inferior to cermet in respect of its toughness, hence the range of its utility has been limited.

Techniques of including whiskers in the ceramics have generally been disclosed in Japanese Patent Kokai Publication No. 59-102861 (for the purpose of imparting high electric conductivity), and in U.S. Pat. No. 4,543,345 (for the purpose of imparting toughness). JP Kokai No. 59-102861 discloses an oxide ceramics such as $Al_2O_3$, $ZrO_2$, MgO as the matrix, while U.S. Pat. No. 4,543,345 discloses matrix of $Al_2O_3$, mullite or $B_4C$. However, these techniques do not provide sufficient compatibility and bonding force between SiC whisker and the matrix.

SUMMARY OF THE DISCLOSURE

It is therefore a primary object of the present invention to provide a ceramic sintered body having high toughness and excellent heat-resistance.

It is another object of the present invention to provide a cutting tool suitable for cutting various metallic and nonmetallic materials at a high speed.

It is still another object of the present invention to provide a method for manufacturing the abovementioned sintered body and cutting tool.

Still further objects of the present invention will become apparent in the entire disclosure.

With a view to attaining the abovementioned objects, the present inventors have strenuously conducted researches and studies, as the result of which they have found out that, by uniformly dispersing SiC whisker having high strength, high heat-resistance and high heat-conductivity in TiC-base ceramics, their toughness could be improved, while still maintaining their heat-resistance.

The TiC-base/SiC whisker composite ceramic according to the present invention, in which Ti is the Group IVa element, is excellent in its compatibility with Si which is the Group IVb element, hence the excellent mechanical strength of the SiC whisker can be taken advantage of.

According to a first aspect of the present invention, there is provided a ceramic cutting tool comprising a TiC-based sintered body consisting essentially of 40% by weight or more of TiC, and 5 to 40% by weight of SiC whisker uniformly dispersed in said sintered body, said SiC whisker having a diameter of 0.2–1.5 μm and a length of 1–20 μm.

According to a second aspect of the present invention there is provided a ceramic cutting tool, wherein said sintered body further comprises no more than 40% by weight (preferably 0.5 to 40%) of $Al_2O_3$.

According to the third aspect of the present invention there is provided a ceramic cutting tool, wherein said sintered body further comprises no more than 19% by weight (preferably 0.03 to 19% by weight, more preferably 0.05 to 10% by weight) of at least one sintering aid selected from the group consisting of AlN and oxides of Mg, Ca, Si, Zr, Ni, Y and rare earth metals (preferably oxides).

According to a fourth aspect of the present invention, there is provided a ceramic cutting tool, wherein no more than 40% (preferably no more than 30%) by weight of TiC is substituted with at least one selected from the group consisting of Ti, nitrides, oxides and borides of Ti, and solid-solution of said nitrides, oxides and borides of Ti.

According to a fifth aspect of the present invention, there is provided a ceramic cutting tool which is obtained by sintering a mixture consisting essentially of 5 to 40% by weight of SiC whisker, 10% by weight or below of a sintering aid, and the balance being a TiC-base composition represented by the following formula in atomic fraction: $(Ti_aM_b)$ $(C_cN_dO_eB_f)_g$ where: M denotes at least one of transition metal elements of Groups IVa, Va and VIa, except Ti, according to the International Periodic Table; and $a+b=1$, $0<b\leq0.5$, $c+d+e+f=1$, $0.5\leq c\leq1.0$, $0\leq d\leq0.5$, $0\leq e\leq0.3$, $0\leq f\leq0.5$, $0.6\leq g\leq1.1$.

The TiC-base $(Ti_aM_b)$ $(C_cN_dO_eB_f)_g$ composition is preferably at least 40% by weight of the sintered body.

The sintering aid is the same as those mentioned in the third aspect except that Zr oxide is not included. The SiC whisker should be of the type mentioned in the first aspect. The IVa group includes Zr and Hf; the Va group includes V, Nb and Ta; and the VIa group includes Cr, Mo and W. In this aspect, $Al_2O_3$ may be incorporated as mentioned in the second aspect. The ($Ti_aM_b$) components preferably include those mentioned in the fourth aspect. The sintering may be carried out in a non-oxidizing atmosphere at a temperature ranging from 1,500° C. to 2,000° C. (preferably 1,700° to 2,000° C., more preferably 1,700° to 1,900° C.).

According to a sixth aspect of the present invention there is provided a process for producing a ceramic cutting tool, which comprises the steps of: providing a mixture by uniformly dispersing and mixing 5 to 40% by weight of SiC whisker in and with at least 40% by weight of TiC the component, no more than 40% by weight of $Al_2O_3$, and no more than 19% by weight of at least one component as a sintering aid which is selected from the group consisting of oxides of Mg, Ca, Si, Zr, Ni and rare earth metals; compacting the mixture, and sintering the compact in a non-oxidizing atmosphere at a temperature ranging from 1,500° C. to 2,000° C. (preferably 1,700° to 2,000° C., more preferably 1,700° to 1,900° C.).

The TiC in the TiC component is preferably substituted with certain substances as mentioned at the fourth aspect. Where metallic Ti is used, the sintering should be continued until a metallic phase of Ti cannot be detected by X-ray diffractometry. The SiC whisker should be adjusted to have the specified diameter and length as mentioned at the first aspect, e.g., by milling or pulverizing or the like.

The process preferably comprises the steps of: uniformly dispersing and mixing 5 to 50 parts by weight of SiC whisker into and with 100 parts by weight of a TiC-based composition including 40 to 94.95% by weight of $Al_2O_3$, and 0.05 to 20% by weight of at least one component as a sintering aid selected from the group consisting of oxides of Mg, Ca, Si, Zr, Ni and rare earth metals; and sintering said mixture (or compact thereof) in a non-oxidizing atmosphere at a temperature ranging from 1,700° C. to 2,000° C.

The foregoing objects, other objects as well as the particular ingredients to be used and the conditions for their treatment according to the present invention will become more apparent and understandable from the entire disclosure.

BRIEF DESCRIPTION OF THE ACCOMPANYING DRAWING

In the drawing.

The single

DESCRIPTION OF THE PREFERRED EMBODIMENTS

Figure 1:
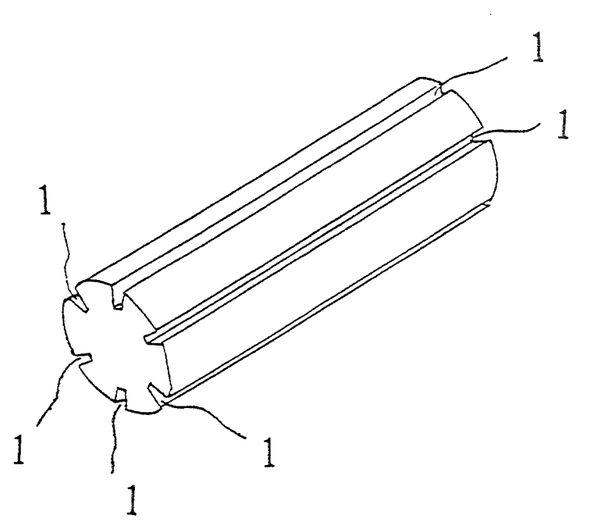
FIG. 1 is a perspective view showing one example of a material to be cut for testing the capability of the ceramic sintered body according to the present invention.

Throughout this specification, the elements are defined by the International Periodic Table; the compositional ratio is denoted by "% by weight" unless otherwise specified.

In the sintered body according to the present invention, the TiC or TiC component with substituent, expressed as $TiC_x$ (generally referred to as "TiC component") is the cardinal component constituting the matrix in the sintered body, the amount thereof being a balance from the total composition, which should preferably be 40% or above, or more preferably 50% or more, or no more than 70%, in order to take advantage of the TiC component.

Particularly preferable is a ceramic composition, in which TiC or the TiC component constitutes a continuous matrix phase.

The quantity of SiC whisker to be added to the TiC-based composition may be in a range of 5 to 40% in the sintered body (preferably about 5 to about 33% in the sintered body which corresponds to about 5 to 50 wt parts with respect to 100 wt parts of the ceramic material of the abovementioned composition). If the content of SiC whisker does not reach 5%, there will be no effect on the anti-chipping property. On the contrary, if its content exceeds 40%, there appear unfavorable results such that uniform dispersibility of the component lowers due to anisotropy of the SiC whisker, hence lowering in the sinterability and anti-chipping property are brought about. The SiC whisker amount is further preferred as being 10 to 30%, or most preferred at 10–20%, of the entire sintered body.

As regards the SiC whisker, it has the following effects. Since the SiC whisker itself has a tensile strength of 1,000 $kg/mm^2$, if it is uniformly dispersed in the sintered body, there will be obtained not only improvement in its mechanical strength and toughness, but also remarkable improvement in hardness. For this purpose, the content of TiC should be 40% or more, and that of SiC whisker ranges from 5 to 40% in the sintered body, respectively, which would produce the ceramic sintered body excellent in its various characteristics. With the SiC whisker being less than 5%, there will be no effect of improvement in the mechanical strength and toughness of the ceramic material. On the contrary, when its content exceeds 40%, the sinterability of the ceramic material becomes poor, and its mechanical strength is unfavorably lowered.

The SiC whisker dispersed in the sintered body should have a size of 0.1 to 1.5 μm in diameter and 1 to 20 μm in length. If the whisker has a diameter of below 0.2 μm, the reinforcing effect due to the whisker is insufficient. On the contrary, if the SiC whisker diameter exceeds 1.5 μm, it is difficult to obtain the sintered body of good quality having less defects in it, hence it is uneconomical. Further, with the SiC whisker having its length of below 1 μm, absorption efficiency of the energy of fracture such as bending of cracks, pull-out of whisker, etc. is poor with the consequence that the effect of improvement in the toughness of the ceramic material is poor. With the whisker having a length of over 20 μm, it becomes difficult to uniformly disperse such whisker in the sintered body by the ordinary method of producing the sintered body. In more details, agglomerated bodies of the whisker tend to occur easily, which unfavorably bring about a decrease in the strength of the sintered body. A diameter of 0.4 to 1.0 μm and a length of 1 to 15 μm (more preferred is 1 to 10 μm) are preferred for the SiC whisker, and an aspect ratio of 1.5 to 30 is preferred (more preferred is 1.5 to 20).

The crystallographic type of the SiC whisker may be either α-type or β-type, which can only be dispersed uniformly in the sintered body.

The substituent for Ti contained in TiC component should form a solid-solution in the TiC in the course of sintering so that it may not remain substantially in the ceramic material as the metal phase (e.g., when metallic Ti is used as the substituent). With such Ti in solid-solution, TiC takes a non-stoichiometrical composition ($TiC_x$) causing the crystallographic structure to be incomplete and unstable, which facilitates the sintering reaction such as the solid phase reaction, and so forth. As the result of this, it is considered that the sinterability of the ceramic material according to the present invention is improved. This phenomenon also signifies that the grain boundary between Al$_2$O$_3$ and TiC, or among the grains of TiC becomes reinforced. In order to impart the above-mentioned characteristic to the ceramic material, metallic Ti may be used in substitution for 30% or less of the TiC. When the amount of Ti exceeds 30% of TiC, there will be a possibility of Ti remaining as the metal phase, with the consequent lowering of the wear-resistant property of the ceramic material from the standpoint of its cutting performance. In the course of sintering, Ti is required to be rendered a solid-solution in TiC to the extent that it may not be detected as the metal phase by at least the X-ray diffractometry. Presence of the metal phase which is small enough as to not being detected by the X-ray diffractometry, but is of a quantity large enough that it can be identified through an optical microscope does not give rise to a problem, since Ti in such amount has no influence on the performance of the ceramic cutting tool.

As to the second aspect of the present invention, by the dispersion of Al$_2$O$_3$, the heat-resistance and the wear-resistance of the ceramic material can be improved. Al$_2$O$_3$ is a chemically stable substance, is excellent in its anti-oxidation property and has a low free energy of formation. Such Al$_2$O$_3$ is dispersed in the TiC component to improve the anti-oxidation property and the chemical stability of the ceramic material as a whole. By this dispersion of Al$_2$O$_3$, there may further be added the anti-oxidation property and the chemical stability to those various excellent properties of TiC, whereby more excellent characteristics of the ceramic material are obtained. Al$_2$O$_3$ also contributes to the function of the sintering aid to the TiC component. Al$_2$O$_3$ may be present up to 40% in the sintered body. However, when it is added to the ceramic composition in a quantity ranging from 0.5 to 40%, it is possible (thus preferred) to attain a satisfactory result in respect of the abovementioned anti-oxidation property and the chemical stability. When Al$_2$O$_3$ is added in a quantity below 0.5%, the resulting effect is not satisfactory. On the contrary, when it exceeds 40%, a negative effect will appear in displaying the characteristic of TiC. The Al$_2$O$_3$ amount is more preferably 5 to 30%.

One or more compounds selected from AlN, oxides of Mg, Ca, Si, Zr, Ni, Y and rare earth metals may be used as the sintering aids in a quantity ranging from 0.03 to 19%* (preferably 0.05 to 10%, more preferably 0.5 to 5%) in sintered body. (*N.B. This corresponds to the amount of 0.05 to 20% in the TiC base composition except for the SiC whisker.) If its content is below 0.03%, the abovementioned effect does not come out sufficiently. On the contrary, when its quantity exceeds 19%, a large amount of metal oxides as the sintering aid lowers the advantageous characteristics of TiC, in particular, the wear-resistance or high temperature characteristics. By the way, even when Mg, Ca, Si, Zr, Ni, Y and rare earth metals are added to the ceramic composition as the other compounds than the oxides, in the form of the nitrides, carbides, etc., for example, they are also able to produce the effect as the for example sintering aid. However, when they are combined with Al$_2$O$_3$, it is preferable to select those which are effective as a sintering aid for Al$_2$O$_3$ per se. The above-listed oxides of Mg, Ca, Si, Zr, Ni, Y and rare earth metals correspond to such effective sintering aids.

When a part of TiC, i.e., less than 40% thereof, is substituted including an oxide, nitride, boride of the Ti, or solid-solution of these, the wear-resistant property, anti-chipping property, or sintrability of the ceramic material can be improved much more. (Note, the term "TiC component" encompasses those with substituents for TiC). Of these, the nitride of Ti is able to readily form a solid-solution in which improves the toughness of TiC per se, and, at a same time, when it is co-present with Al$_2$O$_3$, it also functions as a sintering aid for Al$_2$O$_3$ to thereby further improving the sinterability of the ceramic material. Boride of Ti itself has hardness, by the addition of which improves the wear-resistance of the sintered body improves. Solid-Solutions of any two or more of oxides, nitrides, and borides of Ti (also including carbides) have in themselves the abovementioned effects of each compound in combination. Therefore, the addition of such solid-solutions produces the same resulting effect as in the case of adding each of these compounds singly. When Ti in metallic form is added to TiC, it becomes a solid-solution in the TiC, with the result that the TiC assumes a non-stoichiometric composition (TiCx), whereby the crystallographic structure of TiCx becomes incomplete and instable, making it possible to improve the sinterability of the ceramic material. Also, concerning the high temperature strength of TiCx per se, it may be considered that the mechanical strength and the toughness thereof improved by the form of bonding, in which its inherent covalent bond assumes a property of the metallic bond. It should be noted here that metallic Ti or nitrides, oxides, borides of Ti, or solid-solutions of these compounds, which are to be added for substituting a part of TiC, may be limited to a quantity of 40% or less with respect to TiC, for obtaining various effects. As the quantity of the solid-solution increases beyond 40%, the characteristics of TiC itself will be lost unfavorably. Such substituent is preferably no more than 30% of the TiC component, particularly for the metallic Ti.

As regards the fifth aspect of the present invention, it may be as follows. That is to say, its characteristic is to use a composition as the starting mixture represented by the following formula: $(Ti_aM_b)(C_cN_dO_eB_f)_g$ in atomic fraction.

In particular, the transition metals M in Group IVa, Va and VIa of the Periodic Table assume a solid-solution in TiC to reinforce TiC to be the principal component of the ceramic material. In addition, these transition metals combine with boron, oxygen, etc. to remain in the sintered body, and exhibit excellent affinity for TiC for achieving the dispersion reinforcement or hardening. Above all, Zr and Hf become a solid-solution to increase hardness of the sintered body (note Zr oxide may serve as the sintering aid, too), and contribute to improvement in the toughness thereof through a phase-transformation due to the addition of oxides. V functions to inhibit the grain growth and increases hardness of the sintered body. Nb and Ta improve the high temperature strength of the sintered body. Cr improves hardness and sinterability and absorbs impurities in Fe, Ni, Co or the like. Mo and W, besides increasing toughness, forms a solid-solution in TiC to also increase hardness of the sintered body. When these transition metals, however, become greater in quantity than Ti in terms of mole ratio, the quantity of Ti decreases relatively to become unable to exhibit the excellent characteristics of TiC proper, hence the atomic fraction is set in a range of $0 < b \leq 0.5$.

Of those light (or nonmetallic) elements such as C, N, O and B, O functions to improve hardness of the ceramic material when it form a solid-solution in TiC, to increase the affinity between TiC and oxides such as $Al_2O_3$. When it remains in the form of oxides, they contribute to increase hardness and toughness. However, when its atomic fraction exceeds 0.3 with respect to the entire light element, the toughness of the sintered body decreases to the contrary, so that the atomic fraction is set to be $0 \leq e \leq 0.3$. N, when it assumes a solid-solution in TiC, contributes to increase toughness. Even if it does not assume a solid-solution, it remains in the form of nitride to contribute to improvement in toughness and wear-resistant characteristic of the ceramic material. When its atomic fraction exceeds 0.5 with respect to the entire light element, however, the ceramic material loses its hardness, hence its atomic fraction is set to be $0 \leq d \leq 0.5$. B is difficult to put into solid-solution in TiC. However, a part thereof becomes a solid-solution to increase hardness of the ceramic material. Besides this, when it remains in the form of borides, it contributes to increase hardness of the ceramic material. However, when its atomic fraction exceeds 0.5 with respect to the entire light element, the toughness of the ceramic material will become lowered, hence its atomic fraction is set to be $0 \leq f \leq 0.5$.

When the total atomic fraction of the light elements exceeds 1.1 with respect to the total transition metal including TiC, there will be deposited an isolated light element to bring about generation of pores, decrease in the toughness, etc. On the other hand, if the total atomic fraction of the light elements does not reach 0.6, there will precipitate or be present other compounds to bring about lowering in the high temperature characteristic of the ceramic material, hence the total atomic fraction of the light elements is set to be $0.6 \leq g \leq 1.1$.

The SiC whisker functions to improve the toughness and heat-conductivity of the ceramic material. When its content is below 5%, no satisfactory function thereof can be attained. On the other hand, when its content exceeds 40%, the sinterability and wear-resistance of the ceramic material will decrease.

As regards $Al_2O_3$, the same thing as mentioned in the second aspect will apply. The sintering aid may be present as previously mentioned.

As regards the sintered body relative to these first to fifth aspects of the present invention, its theoretical relative density should preferably be 97% or above, or more preferably 99% or above. Its average crystal grain size should preferably be 10 $\mu$m or below, or more preferably 5 $\mu$m or below.

According to the sixth aspect of the present invention relating to the manufacturing process of the TiC-base/-SiC whisker composite ceramic cutting tools, various methods may be adopted for the manufacture of the sintered body. That is to say, for the sintering method, there may be employed, for example, normal sintering method (N.S), hot-pressing method (H.P.), and hot-isostatic pressing method (H.I.P.). The atmosphere for the sintering should preferably be a non-oxidizing gas, and the pressure therefor may be arbitrarily selected from 0.01 to 2,000 atm. The sintering temperature may be 1,500° to 2,000° C., preferably 17,00° to 2,000° C., more preferably 1,700° to 1,900° C., in a nonoxidizing atmosphere.

The ceramic cutting tools according to the present invention are highly suitable for cutting, in particular, high speed cutting. These tools may be used for successful cutting of a wide range such as ferrous metals, e.g., cast iron, steel; non-ferrous metals, e.g., high nickel, aluminum, titanium; and non-metals. Above all, the ceramic cutting tools of the present invention are suited for cutting difficult-to-cut work such as ductile cast iron (which has been recognized by those skilled in this field of art to be one of the most difficult to cut among types of cast iron). Also, the ceramic cutting tools according to the present invention are useful for mechanical tools and parts which require wear-resistance, corrosion-resistance, heat-resistance, etc.

Certain inevitable impurities might be entrained through the starting materials or process of the production, e.g., Fe, Co, etc.

With a view to enabling those persons skilled in the art to put the present invention into practice, the following preferred examples are presented. It should, however, be noted that these examples are illustrative only and not restrictive, and that various changes and modifications may be made by those skilled persons in the art in the ingredients used and the conditions for sintering without departing from the spirit and scope of the present invention as recited in the appended claims.

EXAMPLE 1

$\alpha$-$Al_2O_3$, 70% of which had a particle size of 1 $\mu$m or below, TiC of its average particle size of 1.1 $\mu$m, Ti of a particle size which passed through a 325-mesh sieve, and a sintering aid(s) has a purity of 99.5% or above were mixed at various ratios as indicated by the Specimen Nos. in Table 1 below, and each of the mixtures was milled in a stainless steel ball mill for 30 hours together with acetone. Thereafter, the acetone was evaporated in a dryer, followed by pulverization of the dried mixture to prepare a base powder, all of which passed through a 60 mesh sieve.

After this, SiC whisker ("SC-9"—a product of ARCO Chemical) having a diameter of 0.6 $\mu$m and a length of 10—80 $\mu$m was added to the base powder at various ratios as indicated by the Speciman Nos. in Table 1 below, and uniformly mixed and dispersed in an $Al_2O_3$ ball mill for 24 hours together with the ethanol, after which ethanol was evaporated to dry the mixture and then the mixture was caused to pass through a 60-mesh sieve to thereby obtain the base powder. The length of the SiC whisker became below 20 $\mu$m.

The thus obtained base powder was sintered at various sintering temperatures and sintering methods as shown in Table 1 below.

The actual conditions for sintering were as follows:
a) normal sintering (N.S.)—two-hour sintering in an argon atmosphere;
b) hot-pressing (H.P.)—30-minute sintering in a graphite mold under a pressure of 200 kg/cm$^2$; and
c) hot-isostatic-pressing (H.I.P.)—one-hour preliminary normal sintering (at temperatures shown in the Table) conducted in an argon atmosphere, followed by further 2.5-hour HIP sintering at a temperature of 1500° to 1800° C. and under a pressure of 1,500 atmosphere.

Each of the sintered bodies was polished by a diamond grinding wheel to the quality of "SNGN 432 TN" and to a surface smoothness of 0.8 S or below (according to JIS-Japanese Industrial Standard), followed by measuring the density relative to the theoretical density, and hardness. Also, the state of Ti in the sintered body was examined by an X-ray diffraction apparatus.

The same measurements and examination were conducted on the comparative examples. The TiC cermet used is one available in the ordinary market.

Note that in all the Tables the sintering temperatures for HIP designate those for the preliminary normal sintering.

a sintering temperature and a sintering method as shown in Table 3.

The actual conditions for the sintering were as follows.

a) normal sintering (N.S.)—one-hour sintering in an argon atmosphere under a reduced pressure;

TABLE 1

| Sample No. | TiC Base Composition (100 parts) | | | | | | | SiC Whisker (parts)* | Sintering Method | Sintering Temp. (°C.) | Relative Theoretical Density (%) | Hardness (Rockwell 45N Scale) | Metallic Phase of Ti (X-ray Diffraction) |
|---|---|---|---|---|---|---|---|---|---|---|---|---|---|
| | TiC (wt %) | Substituted Ti for TiC (wt %) | Al₂O₃ (wt %) | Sintering Aids (wt %) | | | | | | | | | |
| Example | | | | | | | | | | | | | |
| 1 | 50 | 0 | 30 | MgO | 15 | ZrO₂ | 5 | 5 | N.S. | 1800 | 98.1 | 90.5 | Absent |
| 2 | 70 | 0 | 15 | CaO | 5 | Y₂O₃ | 10 | 8 | " | 1850 | 97.5 | 90.0 | " |
| 3 | 85 | 24.1 | 10 | Er₂O₃ | 5 | | | 10 | " | 1800 | 98.5 | 90.5 | " |
| 4 | 62 | 11.9 | 30 | MgO | 4 | Dy₂O₃ | 4 | 10 | " | 1800 | 98.0 | 90.5 | " |
| 5 | 74 | 0 | 25 | MgO | 1 | | | 10 | H.P. | 1850 | 99.2 | 92.3 | " |
| 6 | 72 | 0 | 27 | MgO | 1 | | | 20 | " | 1900 | 99.5 | 93.5 | " |
| 7 | 79.5 | 21.4 | 20 | CaO | 0.5 | | | 25 | " | 1850 | 99.1 | 92.8 | " |
| 8 | 16 | 14.5 | 23 | MgO | 1 | | | 10 | " | 1800 | 99.3 | 92.3 | " |
| 9 | 79.2 | 12.6 | 20 | Y₂O₃ | 0.8 | | | 15 | " | 1850 | 99.2 | 93.3 | " |
| 10 | 89 | 7.9 | 9 | MgO | 1 | Y₂O₃ | 1 | 30 | " | 1950 | 98.5 | 93.8 | " |
| 11 | 83.5 | 15.9 | 15 | CaO | 1 | Dy₂O₃ | 0.5 | 50 | " | 1950 | 97.5 | 92.1 | " |
| 12 | 75 | 0 | 10 | CaO | 5 | Y₂O₃ | 10 | 5 | HIP | 1750 | 99.3 | 91.5 | " |
| 13 | 70 | 0 | 15 | MgO | 5 | Dy₂O₃ | 10 | 20 | " | 1850 | 99.5 | 93.0 | " |
| 14 | 78 | 15.9 | 10 | Dy₂O₃ | 10 | NiO | 2 | 15 | " | 1800 | 99.4 | 92.1 | " |
| 15 | 70 | 9.2 | 20 | CaO | 5 | Y₂O₃ | 5 | 20 | " | 1850 | 99.1 | 92.5 | " |
| 16 | 64 | 10.2 | 25 | MgO | 8 | Dy₂O₃ | 3 | 15 | " | 1850 | 99.6 | 92.2 | " |
| 17 | 82 | 22.0 | 10 | CaO | 4 | Ho₂O₃ | 4 | 10 | " | 1800 | 99.7 | 92.4 | " |
| 18 | 90 | 18.2 | 7 | Dy₂O₃ | 3 | | | 5 | " | 1800 | 99.1 | 91.8 | " |
| Comparison | | | | | | | | | | | | | |
| 1 | 45 | 6.8 | 45 | MgO | 3 | Y₂O₃ | 7 | 10 | N.S. | 1800 | 98.1 | 90.4 | " |
| 2 | 88.5 | 31.0 | 10 | MgO | 1 | CaO | 0.5 | 20 | " | 1800 | 99.7 | 91.2 | Present |
| 3 | 79 | 0 | 20 | MgO | 1 | | | 10 | " | 2050 | 99.7 | 90.3 | Absent |
| 4 | 55 | 8.3 | 20 | CaO | 10 | Y₂O₃ | 15 | 15 | HIP | 1800 | 99.7 | 91.8 | " |
| 5 | 82 | 22.7 | 15 | NiO | 1 | ZrO₂ | 2 | 0 | H.P. | 1750 | 99.3 | 89.5 | " |
| 6 | 79 | 11.9 | 20 | MgO | 1 | | | 10 | " | 1650 | 94.8 | 87.1 | Present |
| 7 | 30 | 0 | 40 | Dy₂O₃ | 20 | NiO | 10 | 20 | HIP | 1800 | 95.8 | 89 | Absent |
| 8 | 79 | 15.8 | 8 | MgO | 7 | Y₂O₃ | 6 | 15 | " | 1550 | 83.4 | 79 | Present |
| 9 | TiC—TiN—Mo₂C—Ni system Cermet | | | | | | | | | | 100 | 88.1 | |

*wt parts with respect to 100 wt parts of TiC base composition see Table 6

EXAMPLE 2

The following components were blended in various compositional ratios as shown in Table 3 below: TiC having a particle size of 1 μm; α-Al₂O₃ having a particle size of 0.7 μm; TiB₂ having a particle size of 6 μm; Ti having a particle size which passed through a 325-mesh sieve; a compound selected from CaO, MgO, SiO₂, ZrO₂, NiO, Y₂O₃, Dy₂O₃, Ho₂O₃, TiO₂ and TiCN, each having a particle size ranging from 0.3 to 2 μm; and SiC whisker shown in Table 2 below. Each of these compositions was mixed uniformly by variously changing the mixing and milling conditions for 0.5 to 48 hours, followed by drying the pulverized mixture. For the purpose of base powder for the normal sintering and the HIP sintering, 3 parts by weight of paraffin were added, and the resultant base powder was subjected to compacting in a metal mold under a pressure of 1.5 tons/cm². The thus obtained compacts were sintered at b) hot-press sintering (H.P.)—15-minute sintering under a pressure of 200 kg/cm² in a graphite mold; and c) hot-isostatic-press sintering (H.I.P.)—one-hour preliminary sintering (at temperatures shown in the Table) in an argon gas atmosphere under a reduced pressure, followed by two-hour hot-isostatic-press sintering under the conditions of 1,500°–1,800° C. and 1,500 atmosphere.

The thus obtained sintered bodies were each examined its characteristics in the same manner as in Example 1 above. The results are shown in Table 5 below.

TABLE 2

| Sign | Type | Diameter (μm) | Length (μm) |
|---|---|---|---|
| A | α | 0.7 ~ 1.5 | 10 ~ 90 |
| B | α | 0.4 ~ 0.7 | 10 ~ 80 |
| C | α | 0.08 ~ 0.2 | 5 ~ 60 |
| D | β | 0.5 ~ 0.8 | 10 ~ 100 |

TABLE 3

| Sample Nos. | TiC (wt %) | A₂O₃ (wt %) | Additional Components (wt %) | SIC Whisker | | | Sintering Method | Sintering Temp. (°C.) | Relative Theoretical Density (%) | Hardness (Rockwell 45N Scale) | Bending Strength (kg/mm²) |
|---|---|---|---|---|---|---|---|---|---|---|---|
| | | | | Sign | wt % | Length μm | | | | | |
| Exam- | | | | | | | | | | | |

TABLE 3-continued

| Sample Nos. | TiC (wt %) | A₂O₃ (wt %) | Additional Components (wt %) | SIC Whisker Sign | SIC Whisker wt % | SIC Whisker Length μm | Sintering Method | Sintering Temp. (°C.) | Relative Theoretical Density (%) | Hardness (Rockwell 45N Scale) | Bending Strength (kg/mm²) |
|---|---|---|---|---|---|---|---|---|---|---|---|
| ple 2 | | | | | | | | | | | |
| 1 | 49 | 30 | 10Ti—2MgO—4Dy₂O₃ | A | 5 | 1–10 | N. S | 1800 | 98 | 90.3 | 63 |
| 2 | 50 | 22 | 15TiO₂—5Y₂O₃ | A | 8 | 1–8 | " | " | 98 | 90.0 | 60 |
| 3 | 61 | — | 15Ti—2MgO—2Dy₂O₃ | D | 20 | 1–16 | H. P | 1800 | 99 | 91.5 | 75 |
| 4 | 68.3 | 0.2 | 10Ti—0.5NiO—1Y₂O₃ | A | 20 | 1–18 | " | 1900 | 99 | 92.2 | 80 |
| 5 | 48 | 25 | 6Ti—1CaO | A | 20 | 1–9 | " | 1850 | 100 | 92.1 | 102 |
| 6 | 45 | 6 | 35TiN—1CaO—3Y₂O₃ | B | 10 | 1–10 | " | 1800 | 100 | 90.7 | 92 |
| 7 | 60 | 20 | 10TiB₂—1CaO—1Dy₂O₃ | A | 8 | 1–14 | " | 1850 | 100 | 92.0 | 87 |
| 8 | 41 | 10 | 10TiCN—2MgO—1-Dy₂O₃ | A | 35 | 1–10 | " | 1850 | 100 | 92.0 | 105 |
| 9 | 45 | 25 | 8Ti—1MgO—1Dy₂O₃ | B | 20 | 1–11 | " | 1850 | 100 | 91.8 | 93 |
| 10 | 64 | 15 | 15Ti | A | 6 | 1–18 | " | 1850 | 99 | 91.2 | 75 |
| 11 | 69 | 20 | 3Dy₂O₃ | A | 8 | 1–11 | HIP | 1700 | 100 | 90.3 | 79 |
| 12 | 55 | 20 | 8Ti—1MgO—1Dy₂O₃ | A | 15 | 1–7 | " | 1750 | 99 | 91.7 | 96 |
| 13 | 49 | 20 | 5ZrO₂—6Y₂O₃ | B | 20 | 1–17 | " | 1700 | 100 | 90.3 | 82 |
| 14 | 67 | 15 | 5Ti—1MgO—2Dy₂O₃ | A | 10 | 1–12 | " | 1700 | 100 | 91.8 | 95 |
| 15 | 62 | 1 | 13TiO₂—1SiO₂—3Dy₂O₃ | A | 20 | 1–15 | " | 1700 | 100 | 91.5 | 85 |
| 16 | 62 | 4 | 5TiB₂—4Ho₂O₃ | B | 25 | 1–18 | " | 1750 | 99 | 91.1 | 80 |
| Comparison 2 | | | | | | | | | | | |
| 1 | 61 | 20 | 10TiB₂—2Dy₂O₃ | C | 7 | 1–17 | HIP | 1700 | 99 | 91.3 | 48 |
| 2 | 52 | 25 | 10Ti—3Y₂O₃ | B | 10 | 0.2–2 | " | 1750 | 99 | 91.6 | 40 |
| 3 | 42 | 20 | 5Ti—1MgO—2Y₂O₃ | A | 30 | 28–75 | " | 1800 | 98 | 90.7 | 43 |
| 4 | Commercial TiC based Cermet | | | — | — | — | — | — | 100 | 87.3 | 122 |
| 5 | 45 | 2 | 3CaO | B | 50 | 1–18 | H. P | 1900 | 96 | 92.4 | 68 |
| 6 | 71 | 20 | 4Ti—2MgO | B | 3 | 1–11 | " | 1800 | 100 | 91.6 | 77 |
| 7 | 28 | 30 | 8TiO₂—4MgO | A | 30 | 1–16 | " | 1850 | 99 | 89.7 | 62 |
| 8 | 42 | 30 | 15TiO₂—5Y₂O₃ | A | 8 | 1–8 | N. S | 1800 | 99 | 89.5 | 48 |

EXAMPLE 3

The following ingredients were mixed in various compositional ratios as shown in Table 4 below, and the mixtures were each sintered in the same manner as in Example 2 above, after which the sintered bodies were examined their characteristics: TiC, ZrC, TaC, HfC, TiN, ZrN, TaN, HfN, Mo₂C, WC and NbC, each having a particle size ranging from 1.0 to 2.0 μm; ZrO₂ and HfO₂, each having a particle size of from 0.1 to 0.5 μm; TiB₂, ZrB₂, TaB₂ and WB, each having a particle size of from 3 to 7 μm; Ti, Zr, Ta, V, W, Mo and B, each having a particle size which passed through a 325-mesh sieve; TiCN and WTiC, each having a particle size ranging from 1.0 to 2.5 μm; α-Al₂O₃ having a particle size of 0.7 μm; CaO, MgO, SiO₂, NiO, Y₂O₃, Dy₂O₃, Ho₂O₃ and AlN, each having a particle size of ranging from 0.3 to 2 μm; α-SiC whisker having a diameter of 0.6 μm and a length of from 10 to 80 μm; and β-SiC whisker having a diameter of 0.6 μm and a length of from 10 to 90 μm.

TABLE 4

| Sample Nos. | Material Amount (wt %) | (Ti$_a$M$_b$)(C$_c$N$_d$O$_e$B$_f$)$_g$ Composition |
|---|---|---|
| Example 3 | | |
| 4 | 52TiC—6Ta | (Ti$_{0.93}$Ta$_{0.07}$) (C$_{1.00}$)$_{0.93}$ |
| 5 | 42TiC—6TiWC—5Ti | (Ti$_{0.98}$W$_{0.02}$) (C$_{1.00}$)$_{0.79}$ |
| 3 | 73TiC—7Ti—7ZrO₂ | (Ti$_{0.98}$Zr$_{0.02}$) (C$_{0.94}$O$_{0.06}$)$_{0.84}$ |
| 4 | 48TiC—7Ta—8ZrO₂ | (Ti$_{0.87}$Zr$_{0.05}$Ta$_{0.08}$)(C$_{0.90}$B$_{0.1}$)$_{0.96}$ |
| 5 | 58TiC—10HfO₂ | (Ti$_{0.97}$Hf$_{0.03}$) (C$_{0.94}$O$_{0.06}$)$_{1.03}$ |
| 6 | 35TiC—8ZrC—10TiCN | (Ti$_{0.91}$Zr$_{0.09}$) (C$_{0.90}$N$_{0.10}$)$_{1.00}$ |
| 7 | 43TiC—5TaN | (Ti$_{0.97}$Ta$_{0.03}$) (C$_{0.97}$N$_{0.03}$)$_{1.00}$ |
| 8 | 42TiC—6Zr—10TiB₂—5WB | (Ti$_{0.83}$Zr$_{0.14}$W$_{0.03}$) (C$_{0.76}$B$_{0.24}$)$_{0.96}$ |
| 9 | 63TiC—5Mo | (Ti$_{0.91}$Mo$_{0.09}$) (C$_{1.00}$)$_{0.91}$ |
| 10 | 40TiC—5Ta—10TiB₂ | (Ti$_{0.88}$Ta$_{0.12}$) (C$_{0.91}$B$_{0.09}$)$_{0.97}$ |
| 11 | 55TiC—20WC—10Mo₂C | (Ti$_{0.85}$W$_{0.09}$Mo$_{0.06}$) (C$_{1.0}$)$_{0.97}$ |
| 12 | 60TiC—5V—5ZrO₂ | (Ti$_{0.82}$V$_{0.02}$Zr$_{0.16}$) (C$_{0.95}$O$_{0.05}$)$_{0.87}$ |
| 13 | 50TiC—10V—20TaN | (Ti$_{0.63}$V$_{0.30}$Ta$_{0.07}$)(C$_{0.89}$N$_{0.11}$)$_{0.71}$ |
| 14 | 51TiC—5Ti—7HfO₂ | (Ti$_{0.98}$Hf$_{0.02}$) (C$_{0.95}$O$_{0.05}$)$_{0.83}$ |
| 15 | 61TiC—5ZrC | (Ti$_{0.95}$Zr$_{0.05}$) (C$_{1.00}$)$_{1.00}$ |
| 16 | 45TiC—5TaC—8Nb | (Ti$_{0.79}$Ta$_{0.03}$Nb$_{0.18}$) (C$_{1.00}$)$_{0.82}$ |
| 17 | 55TiC—10TaN—20Cr₂C₂ | (Ti$_{0.83}$Ta$_{0.05}$Cr$_{0.12}$) (C$_{0.95}$N$_{0.05}$)$_{0.96}$ |
| 18 | 50TiC—9Ti—10Cr₃C₂ | (Ti$_{0.95}$Cr$_{0.05}$) C$_{0.69}$ |
| 19 | 60TiC—10TaN—20Cr₃C₂ | (Ti$_{0.85}$Ta$_{0.04}$Cr$_{0.11}$) (C$_{0.96}$N$_{0.04}$)$_{0.96}$ |
| Comparison 3 | | |
| 1 | 50TiC—20TaN | (Ti$_{0.89}$Ta$_{0.11}$) (C$_{0.45}$N$_{0.55}$)$_{1.00}$ |
| 2 | 40TiC—30TiB₂—10WB | (Ti$_{0.94}$W$_{0.06}$) (C$_{0.44}$B$_{0.56}$)$_{1.34}$ |
| 3 | 40TiC—5Ta | (Ti$_{0.92}$Ta$_{0.08}$) (C$_{1.00}$)$_{0.92}$ |
| 4 | 30TiC—10TiCN—5V | (Ti$_{0.77}$V$_{0.23}$) (C$_{0.88}$N$_{0.12}$)$_{0.77}$ |
| 5 | 40TiC—30ZrO₂—10TaN | (Ti$_{0.76}$Zr$_{0.18}$Ta$_{0.06}$) (C$_{0.64}$N$_{0.05}$O$_{0.31}$)$_{1.18}$ |
| 6 | 40TiC—10Ta—20Mo | (Ti$_{0.56}$Ta$_{0.09}$Mo$_{0.35}$) (C$_{1.0}$)$_{0.56}$ |

TABLE 4-continued

| | 7 | | | TiC—TiN System Cermet | | | | |
|---|---|---|---|---|---|---|---|---|
| Sample Nos. | $(Ti_aM_b)(C_cN_dO_eB_f)_g$ (wt %) | $_2O_3$ (wt %) | | SIC Whisker (wt %) | Sintering Aids (wt %) | | Sintering Method | Sintering Temp. (°C.) | Relative Theoritical Density (%) |

| Sample Nos. | $(Ti_aM_b)(C_cN_dO_eB_f)_g$ (wt %) | $_2O_3$ (wt %) | | SIC Whisker (wt %) | Sintering Aids (wt %) | | Sintering Method | Sintering Temp. (°C.) | Relative Theoritical Density (%) |
|---|---|---|---|---|---|---|---|---|---|
| Example 3 | | | | | | | | | |
| 1 | 58 | 25 | α | 20 | MgO Dy$_2$O$_3$ | 1 1 | H · P | 1850 | 99 |
| 2 | 53 | 20 | α | 20 | MgO Y$_2$O$_3$ | 1 2 | " | 1850 | 99 |
| 3 | 87 | — | α | 10 | Dy$_2$O$_3$ | 3 | " | 1800 | 99 |
| 4 | 63 | 4 | α | 30 | Ho$_2$O$_3$ | 3 | " | 1900 | 99 |
| 5 | 68 | 15 | α | 15 | CaO Ho$_2$O$_3$ | 1 1 | " | 1850 | 99 |
| 6 | 53 | 12 | β | 30 | Y$_2$O$_3$ | 5 | " | 1900 | 99 |
| 7 | 48 | 11 | α | 37 | CaO Y$_2$O$_3$ | 2 2 | " | 1900 | 98 |
| 8 | 63 | 15 | β | 20 | MgO | 2 | " | 1850 | 99 |
| 9 | 68 | 15 | α | 8 | CaO Dy$_2$O$_3$ | 4 5 | N · S | 1800 | 97 |
| 10 | 55 | 18 | α | 25 | CaO Y$_2$O$_3$ | 1 1 | H · P | 1900 | 99 |
| 11 | 85 | 2 | α | 10 | Y$_2$O$_3$ | 3 | " | 1800 | 100 |
| 12 | 71 | 15 | α | 10 | Dy$_2$O$_3$ | 4 | HIP | 1750 | 98 |
| 13 | 80 | — | α | 18 | SiO$_2$ | 2 | H · P | 1850 | 99 |
| 14 | 63 | 18 | α | 15 | CaO Dy$_2$O$_3$ | 1 3 | " | 1800 | 98 |
| 15 | 66 | 17 | β | 15 | NiO Y$_2$O$_3$ | 1 1 | " | 1850 | 99 |
| 16 | 58 | 18 | α | 20 | N Dy$_2$O$_3$ | 2 2 | " | 1850 | 99 |
| 17 | 58 | 21 | α | 20 | Dy$_2$O$_3$ | 1 | " | 1850 | 99 |
| 18 | 85 | — | α | 15 | — | | HIP | 1750 | 99 |
| 19 | 68 | 15 | β | 15 | MgO Dy$_2$O$_3$ | 1 1 | H · P | 1800 | 99 |
| 20 | 90 | — | β | 10 | — | | H · P | 1800 | 99 |
| Comparison 3 | | | | | | | | | |
| 1 | 70 | 13 | α | 15 | MgO Y$_2$O$_3$ | 1 1 | H · P | 1850 | 99 |
| 2 | 80 | 6 | α | 10 | CaO Y$_2$O$_3$ | 2 2 | " | 1800 | 97 |
| 3 | 45 | 6 | β | 45 | CaO Y$_2$O$_3$ | 2 2 | " | 1900 | 96.3 |
| 4 | 45 | 45 | β | 8 | CaO N | 1 1 | " | 1800 | 100 |
| 5 | 80 | 7 | α | 10 | SiO$_2$ Dy$_2$O$_3$ | 1 2 | " | 1800 | 99 |
| 6 | 70 | 17 | α | 10 | Y$_2$O$_3$ | 3 | " | 1800 | 99 |
| 7 | | | | | — | | — | — | — |

TEST EXAMPLES 1 to 3

By use of the sintered bodies in the abovementioned Example 1 and Comparative Example 1, cutting tests were conducted.

The test conditions and the test results are shown in the following Tables 5 and 6, respectively.

TABLE 5

| | 1 | 2 | 3 |
|---|---|---|---|
| Work | FCD55 (HB230) | FCD55 (HB230) | FCD55 (HB230) |
| Cutting Speed (m/min) | 230 | 100 | 600 |
| Rate of Feed (mm/rev) | 0.2 | 0.2 | 0.2 |
| Depth of Cut (mm) | 0.5 | 0.5 | 0.5 |
| Evaluation of Tool Life | Flank wear after passage 4 min. $V_B$ (mm) | Flank wear after passage 20 min. $V_B$ (mm) | Flank wear after passage 1 min. $V_B$ (mm) |

TABLE 6 (see TABLE 1)

| | Test | | |
|---|---|---|---|
| Sample Nos. | 1 $V_B$ (mm) | 2 $V_B$ (mm) | 3 $V_B$ (mm) |
| Example 1 | | | |
| 1 | 0.24 | 0.14 | 0.30 |
| 2 | 0.24 | 0.15 | 0.31 |
| 3 | 0.27 | 0.17 | 0.25 |
| 4 | 0.22 | 0.14 | 0.28 |
| 5 | 0.21 | 0.08 | 0.14 |
| 8 | 0.17 | 0.06 | 0.12 |
| 7 | 0.19 | 0.10 | 0.13 |
| 8 | 0.21 | 0.09 | 0.14 |
| 9 | 0.19 | 0.10 | 0.13 |
| 10 | 0.19 | 0.11 | 0.18 |
| 11 | 0.24 | 0.18 | 0.28 |
| 12 | 0.25 | 0.14 | 0.20 |
| 13 | 0.18 | 0.09 | 0.12 |
| 14 | 0.20 | 0.11 | 0.13 |
| 15 | 0.19 | 0.10 | 0.12 |
| 16 | 0.20 | 0.11 | 0.13 |
| 17 | 0.21 | 0.13 | 0.16 |
| 18 | 0..25 | 0.16 | 0.21 |
| Comparison 1 | | | |
| 1 | 0.45 | 0.42 | Practure after 10 sec. |
| 2 | Fracture | Fracture | Practure |

TABLE 6-continued

| Sample Nos. | Test 1 $V_B$ (mm) | Test 2 $V_B$ (mm) | Test 3 (see TABLE 1) $V_B$ (mm) |
|---|---|---|---|
| 3 | Fracture after 10 sec. | Fracture after 10 sec. | Practure after 10 sec. |
| 4 | Fracture after 10 sec. | Fracture after 10 sec. | Practure after 10 sec. |
| 5 | Fracture after 10 sec. | Fracture after 10 sec. | Practure after 10 sec. |
| 6 | Fracture after 10 sec. | Fracture after 10 sec. | Practure after 10 sec. |
| 7 | Fracture after 10 sec. | Fracture after 10 sec. | Practure after 10 sec. |
| 8 | Fracture after 10 sec. | Fracture after 10 sec. | Practure after 10 sec. |
| 9 | Fracture after 1 min. | 0.18 | Fracture after 20 sec. |

What is claimed is:

1. A ceramic cutting tool having high impact resistance and high resistance against wear in high speed cutting of difficult to cut materials formed of a polished sintered body consisting essentially of 40% by weight or more of TiC and 5 to 40% by weight of SiC whisker uniformly dispersed in said sintered body, said SiC whisker having a diameter of 0.2–1.5 μm and a length of substantially 1–20 μm, said ceramic cutting tool having higher impact resistance and higher resistance against wear in high speed cutting of difficult to cut materials than ceramic cutting tools consisting essentially of 40% weight or more of TiC and 5 to 40% by weight of SiC whiskers of a length greater than 20 μm dispersed in said ceramic cutting tools.

2. The ceramic cutting tool as defined in claim 1, wherein said SiC whisker has a length of 1–10 μm.

3. The ceramic cutting tool as defined in claim 2, wherein said SiC whisker has a maximum length of 7–9 μm.

4. The ceramic cutting tool as set forth in claim 1, wherein said sintered body further comprises 0.5 to 40% by weight of Al$_2$O$_3$.

5. The ceramic cutting tool as set forth in claim 1, wherein said sintered body further comprises 0.03 to 19% by weight of at least one component as a sintering aid selected from the group consisting of AlN and oxides of Mg, Ca, Si, Zr, Ni, Y and rare earth metals.

6. The ceramic cutting tool as set forth in claim 5, wherein said sintering aid is present at 0.05 to 10% by weight.

7. The ceramic cutting tool as set forth in claim 6, wherein said sintering aid is selected from said oxides.

8. A ceramic cutting tool having high impact resistance and high resistance against wear in high speed cutting of difficult to cut materials formed of a polished sintered body consisting essentially of 40% by weight or more of a TiC component comprising TiC and 5 to 40% by weight of SiC whisker uniformly dispersed in said sintered body, said SiC whisker having a diameter of 0.2–1.5 μm and a length of substantially 1–20 μm, said ceramic cutting tool having higher impact resistance and higher resistance against wear in high speed cutting of difficult to cut materials than ceramic cutting tools consisting essentially of 40% weight or more of TiC and 5 to 40% by weight of SiC whiskers of a length greater than 20 microns dispersed in said ceramic cutting tools, wherein no more than 40% by weight of the TiC in said TiC component of said ceramic cutting tool is substituted with at least one selected from the group consisting of Ti, nitrides, oxides and borides of Ti, and solid solutions of said nitrides, oxides and borides of Ti.

9. A ceramic cutting tool having high impact resistance and high resistance against wear in high speed cutting of difficult to cut materials formed of a polished sintered body obtained by sintering a mixture consisting essentially of 5 to 40% by weight of SiC whisker, 10% by weight or less of a sintering aid and the balance being a TiC-base composition represented by the following formula in atomic fraction: $(Ti_aM_b)(C_cN_dO_eB_f)_g$, where M denotes at least one of a transition element of Group IVa, Va and VIa, except Ti, of the International Periodic Table; and $a+b=1$, $0<b\leq0.5$, $c+d+e+F=1$, $0.5\leq c\leq 1.0$, $0\leq d\leq 0.5$, $0\leq e\leq 0.3$, $0\leq f\leq 0.5$, and $0.6\leq g\leq 1.1$; and wherein said SiC whisker has a diameter of 0.2–1.5 μm and a length of substantially 1–20 μm, said ceramic cutting tool having higher impact resistance and higher resistance against wear in high speed cutting of difficult to cut materials than ceramic cutting tools consisting essentially of 40% weight or more of TiC and 5 to 40% by weight of SiC whiskers of a length greater than 20 microns dispersed in said ceramic cutting tools.

10. The ceramic cutting tool as defined in claim 9, wherein said SiC whisker has a length of 1–10 μm.

11. The ceramic cutting tool as defined in claim 10, wherein said SiC whisker has a maximum length of 7–9 μm.

12. The ceramic cutting tool as defined in claim 11, wherein said work is ductile cast iron of a grade selected from the group consisting of FCD 55, FCD 70 and FCD 45.

13. The ceramic cutting tool as set forth in claim 9, wherein said TiC-base composition is present at least 40% by weight in the sintered body.

14. The ceramic cutting tool as set forth in claim 9, wherein said mixture further comprises no more than 10% by weight of at least one component as a sintering aid selected from the group consisting of AlN and oxides of Mg, Ca, Si, Ni, Y and rare earth metals.

15. The ceramic cutting tool as set forth in claim 9, wherein said transition metal elements are selected from the group consisting of Zr, Hf, V, Nb, Ta, Cr, Mo and W.

16. The ceramic cutting tool as set forth in claim 9, wherein said TiC-base composition consists essentially of a combination consisting of TiC; said transition metal elements and carbides, nitrides, borides and oxides thereof and solid solutions of these compounds.

17. The ceramic cutting tool as set forth in claim 16, wherein said carbide is at least one selected from the group consisting of TiC, ZrC, TaC, HfC, Mo$_2$C, WC and NbC.

18. The ceramic cutting tool as set forth in claim 16, wherein said nitride is at least one selected from the group consisting of TiN, ZrN, TaN and HfN.

19. The ceramic cutting tool as set forth in claim 16, wherein said oxide is at least one selected from the group consisting of ZrO$_2$ and HfO$_2$.

20. The ceramic cutting tool as set forth in claim 16, wherein said boride is at least one selected from the group consisting of TiB$_2$, ZrB$_2$, TaB$_2$ and WB.

21. The ceramic cutting tool as set forth in claim 16, wherein said solid solution is at least one of TiCN and WTiC.

22. A ceramic cutting tool having high impact resistance and high resistance against wear in high speed cutting of difficult to cut materials formed of a polished sintered body obtained by sintering a mixture consisting essentially of 5 to 40% by weight of SiC whisker, 10% by weight or less of a sintering aid and the balance being a TiC-base composition represented by the following formula in atomic fraction: $(Ti_a M_b)(C_c N_d O_e B_f)_g$, where M denotes at least one of a transition element of Groups IVa, Va and VIa, except Ti, of the International Periodic Table; and $a+b=1$, $0<b\leq 0.5$, $c+d+e+f=1$, $0.5\leq c\leq 1.0$, $0\leq d\leq 0.5$, $0\leq e\leq 0.3$, $0\leq f\leq 0.5$, and $0.6\leq g\leq 1.1$; and wherein said SiC whisker has a diameter of 0.2–1.5 μm and a length of substantially 1–20 μm, said ceramic cutting tool having higher resistance impact resistance and higher resistance against wear in high speed cutting of difficult to cut materials than ceramic cutting tools consisting essentially of 40% weight or more of TiC and 5 to 40% by weight of SiC whiskers of a length greater than 20 microns dispersed in said ceramic cutting tools, wherein said mixture further comprises no more than 40% by weight of $Al_2O_3$.

23. A ceramic cutting tool having high impact resistance and high resistance against wear in high speed cutting of difficult to cut materials formed of a polished sintered body consisting essentially of 40% by weight or more of a TiC component comprising TiC and 5 to 40% by weight of SiC whisker uniformly dispersed in said sintered body, said SiC whisker having a diameter of 0.2–1.5 μm and a length of substantially 1–20 μm.

said ceramic cutting tool having higher impact resistance and higher resistance against wear in high speed cutting of difficult to cut materials than ceramic cutting tools consisting essentially of 40% weight or more of TiC and 5 to 40% by weight of SiC whiskers of a length greater than 20 microns dispersed in said ceramic cutting tools, wherein no more than 40% by weight of the TiC in said TiC component is substituted with at least one selected from the group consisting of Ti, nitrides, oxides and borides of Ti, and solid-solution of said nitrides, oxides and borides of Ti, and no more than 30% by weight of the TiC is substituted with Ti.

24. The ceramic cutting tool as defined in any one of claims 1, 8, 9, 22, or 23, wherein said impact resistance and resistance against wear measured by a cutting test using a work of a columnar shape having grooves formed along the longitudinal direction at a cutting speed of 100 to 600 m/min.

* * * * *